Jan. 26, 1960     D. HUNTER     2,922,308
RADAR RANGING SYSTEMS
Filed Dec. 16, 1955
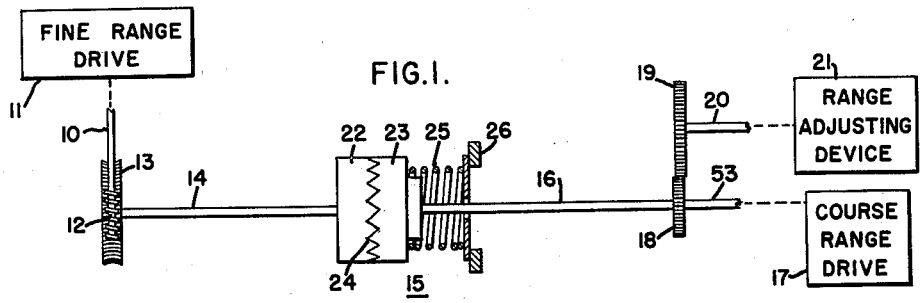
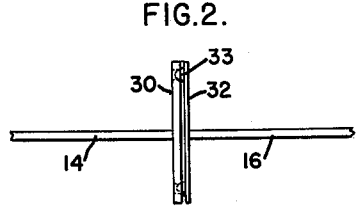
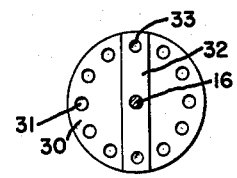
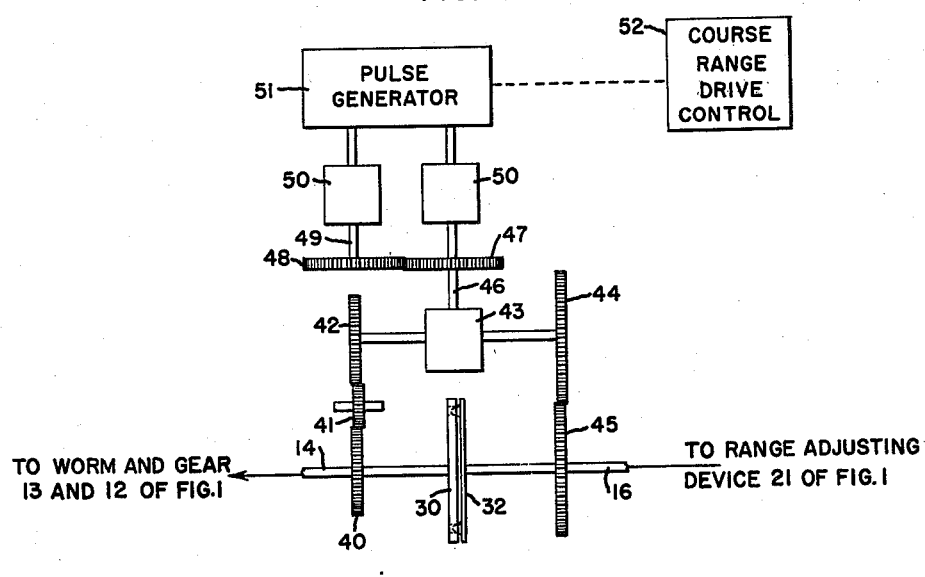
INVENTOR:
DESMOND HUNTER,
BY *Michael Masnik*
HIS AGENT.

United States Patent Office 2,922,308
Patented Jan. 26, 1960

2,922,308

RADAR RANGING SYSTEMS

Desmond Hunter, Bilton, Rugby, England, assignor to The British Thomson-Houston Company Limited, a British company Application December 16, 1955, Serial No. 553,611

3 Claims. (Cl. 74—10.52)

This invention relates generally to range measuring systems, and more particularly to systems for slewing or rapidly varying the range measuring device.

In many range measuring systems, it has been usual to adjust the system by a rotatable control shaft, and to use the angular movement of the shaft as an indicator of range measured by the system. In order that accurate range information can be obtained, it has been usual to drive the adjusting shaft through speed reduction gearing from a first shaft. The angular movement of the first shaft can then be used to give more accurate information on the adjustment of the range measuring system.

In the usual system, the first shaft rotates many times for each revolution of the control shaft. Because of the difficulty of indicating angular movement beyond 360°, the adjustment of the ranging system has been determined by measuring the angular movement of the control shaft in sectors corresponding to one revolution of the first shaft to give a coarse indication of the adjustment. The angular movement of the first shaft is measured only through 360° from a position corresponding to start of measurement of one sector on the control shaft. The angular movement measurements are then combined to indicate adjustment of the range measuring system.

Since the measurement of the movement of the first shaft and the control shaft will give fine and coarse adjustment information, respectively, the shafts will be referred to as the "fine" and "coarse" shaft herein.

In such range measuring systems, it is often desirable that adjustment of the device be made by driving either the fine shaft and the coarse shaft for accurate adjustment and for fast adjustment, respectively.

For example, in radar ranging apparatus, initial adjustment to the radar target may necessitate slewing from zero to a maximum range in a minimum time.

Since the fine and coarse shafts are added for range information, the shafts' rotation must always be coupled with a fixed angular relationship. If, however, shafts remain coupled through the speed reduction gearing during the rotation of the coarse shaft, the referred inertia of the fine shaft would make necessary a more powerful motor source and associated controls than required for the normal operation of the ranging system.

It is, therefore, one object of my present invention to enable slewing in range to be accomplished in a short time without resorting to motor source of high power for the slewing system.

Another object of this invention is to provide an improved range adjustment means for radar systems.

Another object of the invention is to provide improved connecting means between rotatable members.

Generally speaking, the invention contemplates connecting the coarse and the fine shafts together by means of a releasable connection which disconnects the coarse shaft from the fine shaft during the slewing operation, and then re-connects these in the correct angular relationship thereafter. In this manner synchronism between the fine and the coarse shaft rotation is maintained for purposes of measuring range information, while rapid changes in angular position of the coarse shaft is permitted without the necessity of a large motor source.

The features of my invention, which I believe to be novel, are set forth with particularity in the appended claims. My invention, itself, however, both as to its organization and method of operation, together with further objects and advantages thereof, may be best understood by reference to the following description taken in connection with the accompanying drawings, in which:

Figure 1 is a schematic diagram of one form of my invention;

Figure 2 is a modification of a clutch shown in Figure 1;

Figure 3 is an end view of the clutch shown in Figure 2; and,

Figure 4 is a schematic diagram of a modification of the invention using the clutch shown in Figure 2.

In the figures similar parts are given the same identification character.

In Figure 1 of the drawings the range measuring device embodying one modification of the present invention is shown to include a fine shaft 10. The fine shaft 10 is driven by a fine range drive 11, such as a servo driving the shaft in response to measurement of the target position by an automatic range tracking system. Reference can be made to Patent 2,467,208, issued to W. C. Hahn on April 12, 1949, for the details of an automatic range tracker. Shaft 10 carries a worm gear 12 engaged with gear 13 mounted on shaft 14. Connecting means 15 couples shaft 14 to shaft 16. Shaft 16 is driven by the coarse range drive 17, such as a slewing drive mechanism in a radar ranging system. Shaft 16 carries a gear 18 engaged with gear 19 on the output shaft 20 which drives the range adjusting device 21, such as an aperture adjusting device in a radar system.

The connecting means 15 includes a releasable connection having relatively moveable plates 22 and 23 which are shown with mutually engaging serrated faces 24. The number of serrations are determined by the speed ratio between the fine shaft 10 and the coarse shaft 16. Plate 22 of the releasable connection is fixedly mounted on shaft 14. Plate 23 of the releasable connection is rotatably fixed but slideably moveable on shaft 16 by such means as a splined shaft or key-keyway connection. Plate 23 is biased toward plate 22 by spring means 25 acting between the clutch plate and a fixed abutment 26. By adjusting the pitch of serrations 24 with respect to the coefficient of friction of the material of the serrated surface, forced rotation of shaft 16 with respect to shaft 14 will cause plate 23 to compress the biasing spring 25 as the plate rides on the inclined plane of the serrations, allowing the relative rotation.

During normal operation, however, the releasable connection remains in driving engagement transmitting motion from the first shaft 14 to the second shaft 16. Thus, during normal operation, the fine range drive 11, for example the fine range adjusting means of a radar ranging system, transmits power to the range adjusting device of said radar through the coupling. When necessary, however, slewing in range can be accomplished by rotation of shaft 16 by the coarse range drive 17 through the second input member 53. The coarse range drive can be a manual or an automatic drive. When shaft 16 is rotated, the output shaft 20 is rotated through gears 18 and 19. However, since the worm drive 12 and 13 is an irreversible transmission, gear 13 will not turn and slippage will occur at the serrations of the plates. By suitable design of the number of serrations with respect to the speed ratio between the input shaft 10 and the output 20, the releasable connection will re-engage only when the two shafts are synchronized. For example, in one embodiment the speed ratio between shafts 10 and 20 was 100 to 1, and the speed ratio between shafts 16 and 20 was 2 to 1. One revolution of shaft 20 represented 100,000 yards' variation in range. One rotation of shaft 16 then represented 50,000 yards' variation, and one rotation of shaft 10 represented a 1,000 yard variation in range. The plates were provided with ten serrations, and the two plates will re-engage in synchronism for every 5,000 yards of range indication. Slewing is accomplished by rotating the shaft 16 until the range has been slewed within 5,000 yards of the target. The range drive is then transferred to the fine range input, such as an auto-follower of radar. The clutch re-engages when the serrations match, and thus the input and output shaft synchronization is not disturbed by the slewing operation. The range measurement is made by the proper addition of the angular movement in the fine shaft or first input member 10 and output shaft 20.

In some cases, the uneven torque requirements imposed on the coarse range drive caused by forced slippage of the serrations on the faces 22 and 23 is undesirable. In this case, a modification of the releasable connection shown in Figure 1 may be used. The modification is shown in Figures 2 and 3, in which similar parts are identically numbered. The releasable connection includes a disc 30, having number of spaced indentations or holes 31 spaced at a constant radius from the center. The disc is attached to the shaft 14. Shaft 16 carries a spring 32 having protrusions 33 at opposite ends, and so dimensioned as to engage the indentations in the plate 30.

In operation, shaft 14 is rotated. Shaft 16, being lightly loaded, will be driven through the releasable connection. For slewing, shaft 16 is rotated. Shaft 14 is restrained by the worm gear as explained above. When control is returned to the fine drive, re-engagement of the spring 32 with the recesses 31 in the plate 30 will provide synchronization between the input and the output shafts, 10 and 20 respectively, in the same manner as the clutch shown in Figure 1.

To insure proper re-engagement of the clutch shown in Figures 2 and 3 in synchronization, the embodiment shown in Figure 4 is useful. As employed in this embodiment, shaft 14 carries a gear 40 which meshes through an intermediate or idler gear 41 with a gear wheel 42 associated with a sun pinion of a differential gear 43. The other sun pinion of the differential 43 is associated with a shaft carrying the gear wheel 44 meshing with gear 45 mounted on shaft 16. Shaft 16 is connected to the range adjusting device as shown in Figure 1. The planet pinion carrier of the differential gear 43 is driving connected to shaft 46. Under normal conditions when shafts 14 and 16 rotate together, gears 42 and 44 rotate in opposite directions, causing no movement of shaft 46. Shaft 46 carries a gear 47 meshing with a second gear 48 mounted on shaft 49. Shafts 46 and 49 are each driving associated with a solenoid-driven rachet type mechanism 50. Each of said mechanisms rotate stepwise when supplied with a current pulse. Current pulses are provided by pulse generator 51 supplying current pulses in accordance with signals derived from the coarse range drive control 52.

In normal operation, driving of shaft 14 causes associated movement of shaft 16 through the coupling of the clutch plates 30 and 32. When slewing is required, the pulse generator will activate one of the solenoid mechanisms 50. Rotation of the associated shafts 46 and 49 causes relative rotation between gears 42 and 44. Since shaft 14 is prevented from angular rotation by the worm gear 12, the angular movement affected by the rachet mechanism will operate to rotate clutch plate 32 with respect to plate 30. Each of the rachet mechanisms are so dimensioned with associated gearing that each stepwise rotation will cause the clutch plates to rotate, one with respect to the other, over the angular interval between indentations on clutch plate 30. After the required degree of slewing has been accomplished, clutch plates 32 and 30 are re-engaged and the drive operates in the normal proper manner. If slewing in only one direction is required, only one of the mechanisms 50 is necessary.

While a specific embodiment has been shown and described, it will, of course, be understood that various modifications may yet be devised by those skilled in the art which will embody the principles of the invention and found in the true spirit and scope thereof.

What I claim as new and desire to secure by Letters Patent of the United States is:

1. In combination, a range measuring system having a range adjusting mechanism, a first input member, a fine range adjusting means drivingly associated with said first input member, a first shaft, means coupling said first input member to said first shaft, said coupling means comprising a worm and gear for the irreversible transmission of rotation from said first input member to said first shaft, a second input member, a coarse range adjusting means drivingly associated with said second input member, a second shaft, means coupling said second input member to said second shaft, an output shaft, a range adjusting device controlled by said output shaft, means for angularly driving said output shaft by said second shaft, means for angularly driving said second shaft by said first shaft, said last-named means comprising a releasable connection for disconnecting said second shaft from angular driving engagement with said first shaft when said coarse adjusting means drives said second shaft through a given angle of rotation and for reconnecting said first shaft to said second shaft in a predetermined angle relationship when said second shaft has been rotated through said given angle.

2. In combination, a radar range measuring system having a range adjusting mechanism, a first input member, a fine range adjusting means drivingly associated with said first input member, a first shaft, means coupling said first input member to said first shaft, said coupling means comprising a worm and gear for the irreversible transmission of rotation from said first input member to said first shaft, a second input member, a coarse range adjusting means drivingly associated with said second input member, a second shaft, means coupling said second input member to said second shaft, an output shaft, a range adjusting device controlled by said output shaft, means for angularly driving said output shaft to said second shaft, means angularly driving said second shaft by said first shaft, said last named means comprising a first plate fixedly mounted on said first shaft, a second plate rotatably fixed to and slideably mounted on said second shaft, spring means urging said second plate towards said first plate, said first and second plates having engagement means, said last named means adapted to engage said first and second plates at one of several fixed increments of relative rotation between said first and second plates in response to an angular driving force imparted by said first shaft to said second shaft, said increments equalling the relative rotation corresponding to one rotation of said first input member, said first and second plates responsive to an angular driving force imparted to said second shaft by said second member for changing said increment of engagement.

3. In combination, a radar range measuring system having a range adjusting mechanism, a first input member, a fine range adjusting means drivingly associated with said first input member, a first shaft, means coupling said first input member to said first shaft, said coupling means comprising a worm and gear for the irreversible transmission of rotation from said first input member to said first shaft, a second input member, a coarse range adjusting means drivingly associated with said second input member, a second shaft, means coupling said second input member to said second shaft, an output shaft, a range adjusting device controlled by said output shaft, means for driving said output shaft by said second shaft, means for driving said second shaft by said first shaft, said last named means comprising a first plate fixedly secured to said first shaft, said first plate having a plurality of indentations at a constant radius from said first shaft and at a fixed angular displacement from each other, a second plate having spring means adapted for engagement with said indentations, a differential assembly having two sun pinions and a planet pinion carrier, means coupling said first and second plates to a respective sun pinion, said means adapted to rotate said respective sun pinions in equal and opposite directions when said first and second plates are engaged, and means for rotating said planet pinion carrier.

References Cited in the file of this patent

UNITED STATES PATENTS

| | | |
|---|---|---|
| 1,859,796 | Ready | May 24, 1932 |
| 2,238,739 | Jarvis | Apr. 15, 1941 |
| 2,716,897 | Wulfsberg | Sept. 6, 1955 |
| 2,757,768 | Landerer | Aug. 7, 1956 |

FOREIGN PATENTS

| | | |
|---|---|---|
| 832,730 | France | July 4, 1938 |
| 480,132 | Great Britain | Feb. 17, 1938 |